US008533365B2

(12) United States Patent
Ohashi

(10) Patent No.: US 8,533,365 B2
(45) Date of Patent: Sep. 10, 2013

(54) PROGRAM USE SYSTEM, PROGRAM USE METHOD AND PROGRAM

(75) Inventor: Yoshinori Ohashi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/927,614

(22) Filed: Nov. 19, 2010

(65) Prior Publication Data

US 2011/0161528 A1 Jun. 30, 2011

(30) Foreign Application Priority Data

Dec. 25, 2009 (JP) ................................ P2009-296062

(51) Int. Cl.
*G06F 3/00* (2006.01)

(52) U.S. Cl.
USPC ...................................... 710/5; 710/8; 710/16

(58) Field of Classification Search
USPC .................................................... 710/5, 8, 16
See application file for complete search history.

(56) References Cited

U.S. PATENT DOCUMENTS

2002/0140952 A1* 10/2002 Fukasawa ...................... 358/1.6
2011/0287757 A1* 11/2011 Nykoluk et al. .............. 455/419

* cited by examiner

*Primary Examiner* — Idriss N Alrobaye
*Assistant Examiner* — Zachary K Huson
(74) *Attorney, Agent, or Firm* — Lerner, David, Littenberg, Krumholz & Mentlik, LLP

(57) ABSTRACT

Of an existing macro for controlling one or more first devices, device designation information for designating each electronic device in the first devices in the macro is converted to category designation information for designating a category of the electronic device based on device information of the electronic device, and the converted existing macro is recorded. A macro usable for controlling one or more second devices is selected from recorded existing macros based on device information of a controller and the first and second devices. Category designation information in the selected macro is converted to device designation information for designating the electronic device in the second electronic devices, belonging to the category designated by the category designation information, based on the device information of the controller and the first and second devices.

9 Claims, 15 Drawing Sheets

FIG.3

M1

```
<send key=“Power” target=“TV_uid0000001”/>
<send key=“Power” target=“BDPlayer_uid0000002”/>
<wait second=“3”/>
<send key=“Play” target=“BDPlayer_uid0000002”>
```

FIG.6

CL

```
<keyList>
        <key name="Home" ir="AAAAAAAAHFoAAABCAA=="/>
        <key name="Option" ir="AAAAAAAAHFoAAAA/AA=="/>
        <key name="Return" ir="AAAAAAAAHFoAAABDAA=="/>
        <key name="Up" ir="AAAAAAAAHFoAAAA5AA=="/>
        <key name="Down" ir="AAAAAAAAHFoAAAA6AA=="/>
        <key name="Right" ir="AAAAAAAAHFoAAAA8AA=="/>
        <key name="Left" ir="AAAAAAAAHFoAAAA7AA=="/>
        <key name="Enter" ir="AAAAAAAAHFoAAAA9AA=="/>
                        ⋮
</keyList>
```

FIG.15

M2

```
<send key=“Power” target=“TV”/>
<send key=“Power” target=“BDPLAYER”/>
<wait second=“3”/>
<send key=“Play” target=“BDPLAYER”>
```

⇩

M3

```
<send key=“Power” target=“PROJECTOR_uid0000003”/>
<send key=“Power” target=“DVDPlayer_uid0000004”/>
<wait second=“3”/>
<send key=“Play” target=“DVDPlayer_uid0000004”>
```

PROGRAM USE SYSTEM, PROGRAM USE METHOD AND PROGRAM

CROSS-REFERENCE TO RELATED APPLICATION

The present application claims priority from Japanese Patent Application No. JP 2009-296062 filed in the Japanese Patent Office on Dec. 25, 2009, the entire content of which is incorporated herein by reference.

BACKGROUND OF THE INVENTION

1. Field of the Invention

The present invention relates to a program use system, a program use method and a program.

2. Description of the Related Art

In order to control one or more electronic devices, there is known a program such as a macro for automatically executing a series of commands described in the form of program. The macro (program) is created according to a use environment of an electronic device and executed on a controller such as a commander or a personal computer. Here, the use environment of the electronic device is susceptible to an electronic device model, category, supported command type and code, a compatible control system, combination of electronic devices in cooperation with each other, a control system compatible for the controller and the like.

SUMMARY OF THE INVENTION

Here, as creating of a macro needs some time and labor, there is a demand of using an existing macro. However, the macro largely depends on a use environment of the electronic device. If the use environment of the electronic device is changed, generally, the existing macro cannot be used as it is. Particularly, in controlling a newly developed electronic device, the existing macro cannot be used as it is unless the macro compatible for the electronic device is created. Further, when two or more electronic devices are controlled in cooperation with each other, it is necessary to search for a macro that is compatible for combination of the electronic devices, and such a search work often brings many difficulties.

In view of the foregoing, it is desirable to provide a program use system, a program use method and a program, capable of making a program, which is created for a certain electronic device in a certain use environment, usable as a program for an electronic device in another use environment.

According to the first embodiment of the present invention, there is provided a program use system including a first converter configured to convert device designation information for designating each electronic device in one or more first electronic devices in an existing program for controlling the first electronic devices, to category designation information for designating a category of the electronic device based on device information of the electronic device, a recorder configured to record the existing program of which the device designation information is converted, a selector configured to select a program usable for controlling one or more second electronic devices from one or more existing programs recorded based on device information of the first and second electronic devices and a controller for controlling the second electronic devices, and a second converter configured to convert category designation information in the program selected to device designation information for designating the electronic device in the second electronic devices, belonging to a category designated by the category designation information, based on the device information of the controller and the first and second electronic devices.

According to such a structure, selection of an existing program and rewriting of a new program are performed based on a category of an electronic device. Therefore, it is possible to use a program, which is created for an electronic device in a certain use environment, as a program for an electronic device in another use environment.

The first and second electronic devices may be classified into categories that represent functions of the electronic devices hierarchically, and when there is no electronic device in the second electronic devices that corresponds to the category designation information expressed by a first level, the second converter may convert the category designation information in the program to the device designation information for designating the electronic device corresponding to the category designation information expressed by a second level that is upper level of the first level.

The recorder may record the device information of the first electronic devices.

The device information of the electronic device may contain command information indicating a control command usable by the controller to control the electronic device.

The command information may contain information which is used commonly between the electronic devices for identifying a type of the control command.

The command information may contain information showing a control system of the control command.

The device information of the controller may contain information indicating a control system usable by the controller to control the electronic device.

According to the second embodiment of the present invention, there is provided a program use method, including the steps of converting device designation information for designating each electronic device in one or more first electronic devices in an existing program for controlling the first electronic devices, to category designation information for designating a category of the electronic device based on device information of the electronic device, recording the existing program of which the device designation information is converted, selecting a program usable for controlling one or more second electronic devices from one or more existing programs recorded based on device information of the first and second electronic devices and a controller for controlling the second electronic devices, and converting category designation information in the program selected to device designation information for designating the electronic device in the second electronic devices, belonging to a category designated by the category designation information, based on the device information of the controller and the first and second electronic devices.

According to the third embodiment of the present invention, there is provided a program for causing a computer to execute the program use method. Here the program may be provided using a computer readable recording medium, or may be provided via a communication method.

As described above, the present invention can provide a program use system, a program use method and a program capable of making a program, which is created for an electronic device in a certain use environment, usable as a program for an electronic device in another use environment.

BRIEF DESCRIPTION OF THE DRAWINGS

FIG. 3 illustrates an example of macro;

FIG. 6 illustrates an example of a list of command codes;

FIG. 15 illustrates an example of conversion of designation information in the providing processing.

DETAILED DESCRIPTION OF THE EMBODIMENT

Figure 1:
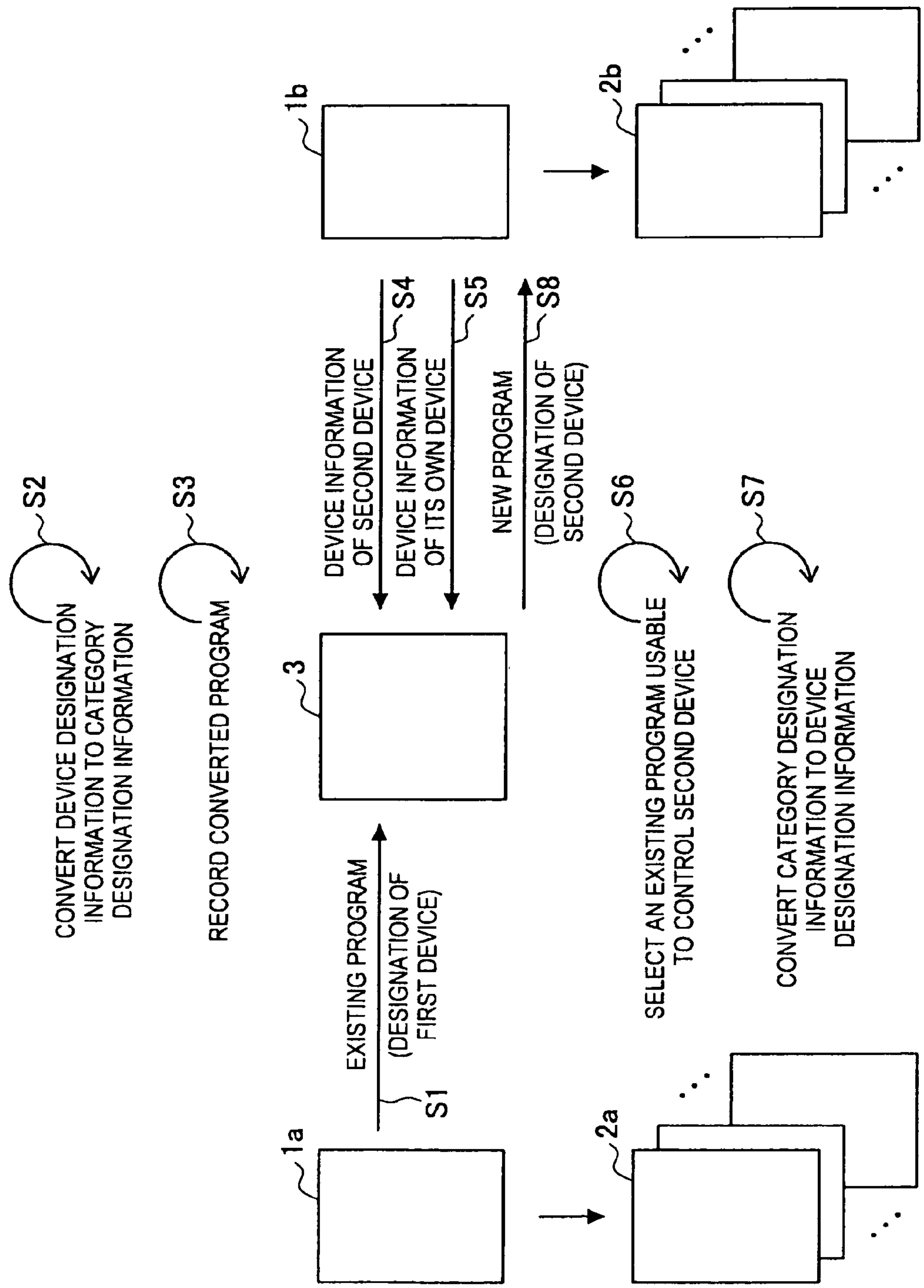
FIG. 1 illustrates an overview of a program use system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[1. Overview of Program Use System]

An overview of a program use system according to an embodiment of the present invention will be described first with reference to FIG. 1.

As illustrated in FIG. 1, the program use system includes one or more controllers 1*a*, 1*b*, . . . (hereinafter also referred to as a "controller 1"), one or more electronic devices 2*a*, 2*b*, . . . , (hereinafter also referred to as a "device 2") controlled by the controller 1 and a managing device 3 for managing device information of the devices 2 and a program. The program use system makes an existing program, which is created to control one or more first devices 2*a*, usable as a new program for controlling one or more second devices 2*b*.

In the following description, each first device 2*a* is controlled by the controller 1*a* and each second device 2*b* is controlled by the controller 1*b*. However, the first and second devices 2*a* and 2*b* may be controlled by one controller.

The controller 1*a* registers an existing program, which is created to control the first device 2*a*, in the managing device 3 (step S1). The managing device 3 converts device designation information for designating each device 2 in the first devices 2*a* in the existing program to category designation information for designating a category of the device 2 based on device information of the first device 2*a* (S2). In addition, the managing device 3 records the existing program in which the device designation information is converted (S3).

In order to obtain a program usable to control the second device 2*b*, the controller 1*b* provides device information of itself and the second device 2*b* to the managing device 3 (S4, S5). The managing device 3 uses the device information of the controller 1*b* and the first and second devices 2*a*, 2*b* as a basis to select, from one or more existing programs, a program usable to control the second device 2*b* (S6).

The managing device 3 converts category designation information in the program selected based on the device information of the controller 1*b* and the first and second devices 2*a*, 2*b*, to device designation information for designating the device 2 in the second devices 2*b* belonging to the category designated by the category designation information (S7). Then, the managing device 3 provides the converted program as a new program to the controller 1*b* (S8).

Through this step, as selection of the existing program and rewriting of the new program are conducted based on the category of the device 2, a program created for the device 2*a* in a certain use environment can be used as a program for the device 2*b* in another use environment. Here, conversion of the device designation information and the category designation information may be conducted in the controller 1 instead of the managing device 3.

[2. Macro Registering, Search and Providing System]

A macro (program) registering, search and providing system to which the above-description program use system is applied will be described next with reference to FIGS. 2 and 3.

Figure 2:
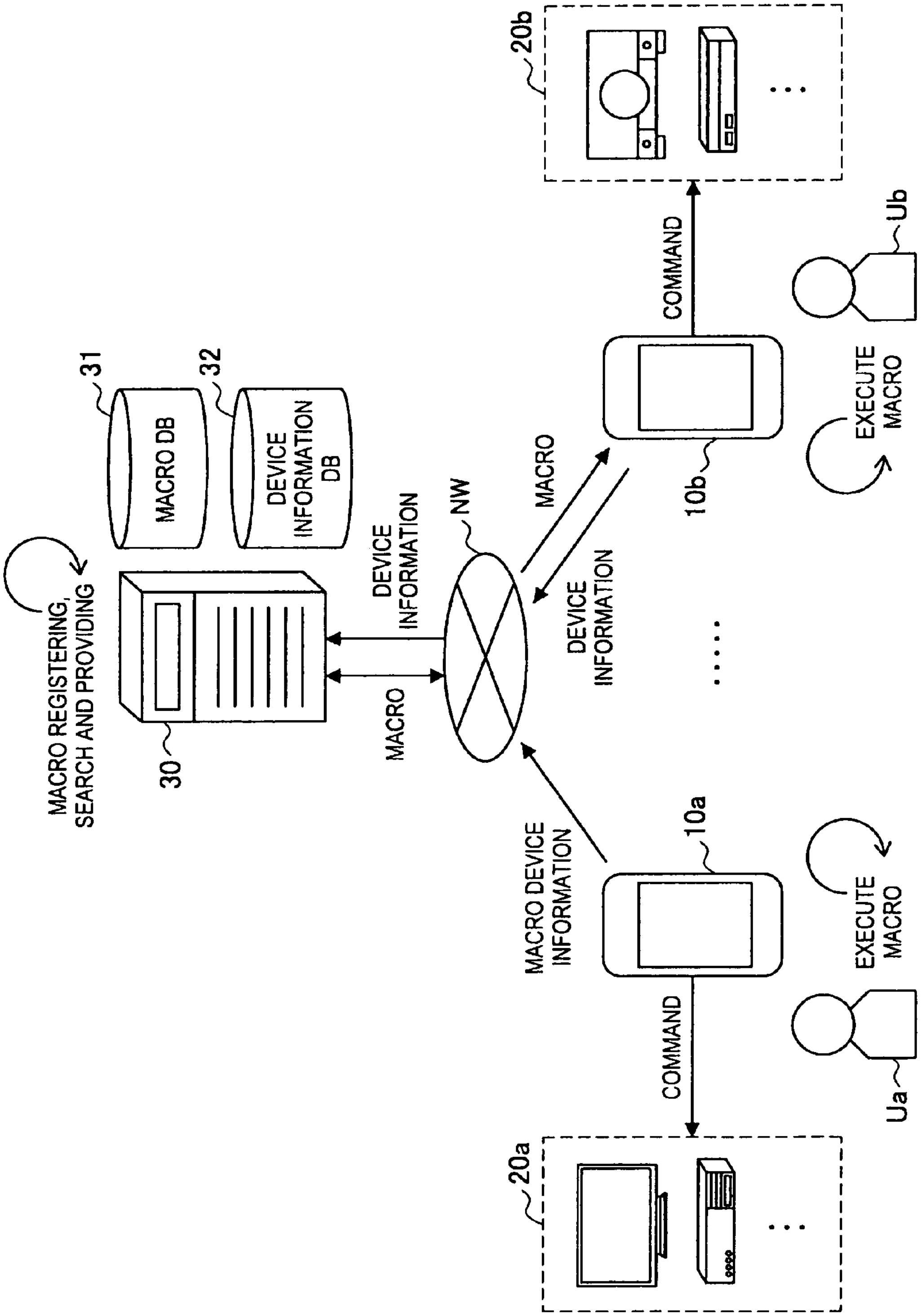
FIG. 2 illustrates a structure of a macro registering, search and providing system to which the program use system is applied.

As illustrated in FIG. 2, the system includes one or more commanders 10*a*, 10*b*, . . . (hereinafter referred to as a "commander 10"), one or more devices 20*a*, 20*b*, . . . , (hereinafter referred to as a "device 20") and a service server 30. Here, the first device 20*a* represents a group of one or more devices in a first use environment and the second device 20*b* represents a group of one or more devices 20 in a second use environment that is different from the first use environment.

The commander 10 is one example of the controller such as a commander, a personal computer, a PDA, a cell phone or the like. The device 20 may be a TV receiver, a projector, monitor, a DVD/BD player, a DVD/BD recorder, a personal computer, a lighting device or the like, and is controlled by the commander 10.

The service server 30 is a server device including a macro DB 31 for managing macros for controlling the device 20, and a device information DB 32 for managing device information of the device 20 controlled by macros. The macro DB 31 and the device information DB 32 may be provided in separate server devices, not in the service server 30.

The commander 10 performs wire or wireless communication with the device 20 to control the device 20. To enjoy a service, the commander 10 performs communication with the service server 30 via a network NW. Here, the commander may perform communication with the device 20 via the network NW. The commander 10 and the service server 30 hold programs for executing the program use method in a memory or the like, read a program from the memory or the like and execute it on the CPU.

In the example illustrated in FIG. 2, the service server 30 serves as first and second converters for converting the designation information by execution of the program, a recorder (macro DB 301) for recording an existing macro to control the first device 20*a* and a selector for selecting an existing macro usable to control the second device 20*b*.

A user Ua can register, in the macro DB 31 and the device information DB 32, device information of the first device 20*a* and the existing macro created to control the first device 20*a* by the use of the commander 10*a*. Here, the existing macro may be created by the use of the commander 10*a* or another device. The service server 30 uses the macro DB 31 and the device information DB 32 to manage the device information of the first device 20*a* and the existing macro.

A user Ub can search the macro DB 31 for an existing macro usable to control the second device 20*b* by the use of the commander 10*b*. The service server 30 uses the device information of the commander 10*b* and the first and second devices 20*a*, 20*b* as a basis to search the macro DB 31 for a corresponding existing macro and provides a search result to the user Ub.

The user Ub can use the commander 10*b* to select a desired macro from the search result and obtain it from the macro DB 31. The service server 30 uses the device information of the commander 10*b* and the first and second devices 20*a*, 20*b* as a basis to rewrite the selected macro to the new macro and provide it to the user Ub. The user Ub can control the second device 20*b* by executing the macro by the commander 10*b*.

Here, in the existing macro, the device designation information for designating each device 20 in the first device 20*a* is converted into the category designation information for designating the category of the device 20, based on the device information of the first device 20*a*. Besides, in the selected macro, the device information of the commander 10*b* and the first and second devices 20*a* and 20*b* is used as a basis to convert the category designation information into device designation information for designating the device 20 in the second device 20*b* belonging to the category designated by the category designation information.

FIG. 3 illustrates an example of the macro described using XML. The macro M1 is a series of commands for controlling one or more devices 20 described in the form of a program. The command generally includes information indicating a type of the command and information for designating the device 20 that is to be controlled by the command (device designation information), and sometimes it does not include the device designation information.

In the example illustrated in FIG. 3, transmission of the command to the device 20 is illustrated by a send tag with key attribute and target attribute. The key attribute represents the command type by the use of a virtual code common between the devices 20. The target attribute designates the device 20 to be controlled by the command with the use of an ID of the device 20.

Here, when the macro M1 illustrated in FIG. 3 is executed, the "power" command is transmitted to the device "TV_uid0000001" and the "power" command is transmitted to the device "BDPlayer_uid0000002". Then, after waiting for three seconds by the wait tag, the "play" command is transmitted to the device "BDPlayer_uid0000002".

[3. Macro Registering Processing]

Next description is made about macro registering processing, with reference to FIGS. 4 to 8.

Figure 4:
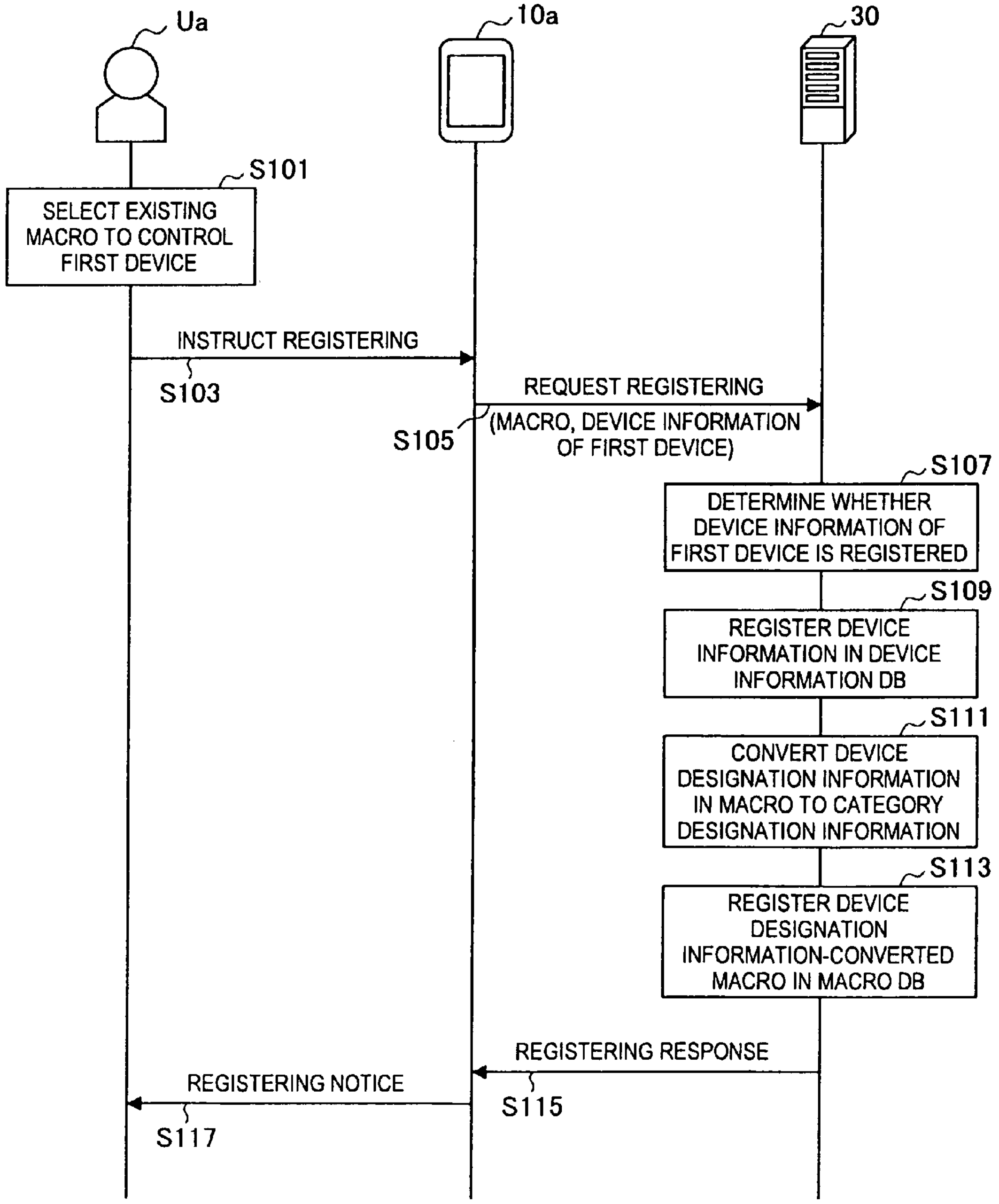
FIG. 4 is a sequence diagram illustrating a procedure of macro registering processing.
Figure 5:
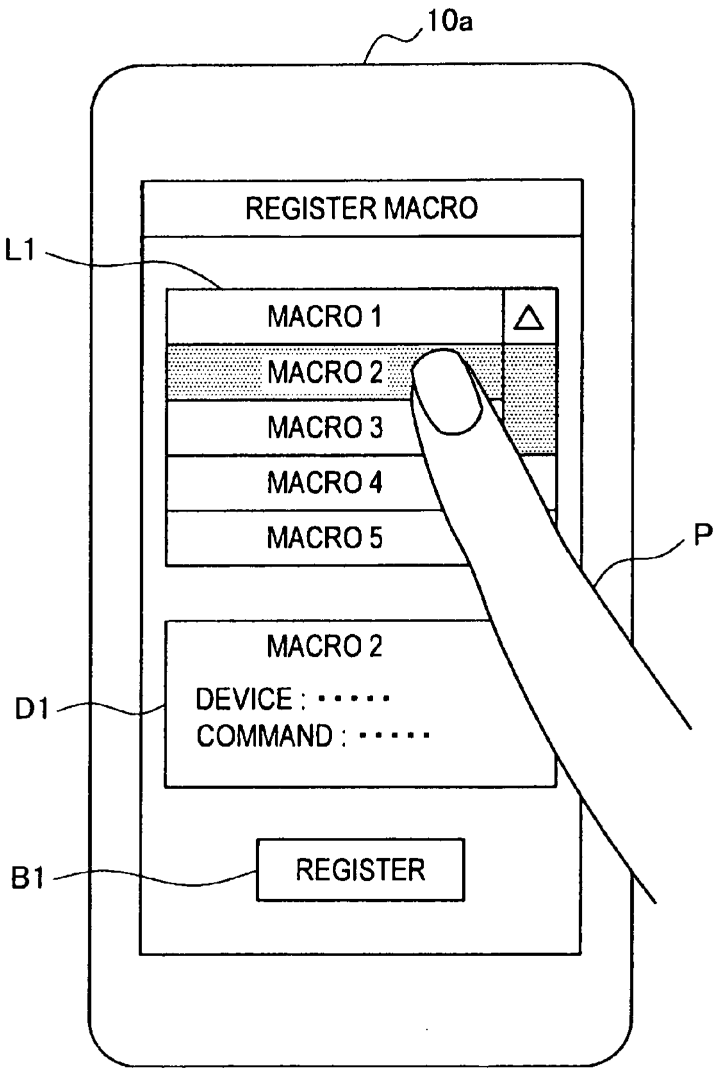
FIG. 5 illustrates an example of an operation screen image in the registering processing.

FIG. 4 illustrates a procedure of the macro registering processing. The user Ua instructs macro registration on an operation screen image shown in FIG. 5. On the operation screen image, a list L1 is illustrated which shows existing macros created to control one or more first devices 20*a*. The user Ua selects a desired macro to register from the list L1 (step S101) and instructs registering by the operation of the register button B1 (S103). Here, in the example of FIG. 5, the "macro 2" is selected by the pointer P and details D1 of the "macro 2" are illustrated.

When registering of the macro is instructed, the commander 10*a* transmits the registration request to the service server 30 (S105). The registration request includes the macro to be registered and the device information of each device in the first devices 20*a*. Here, the device information contains an ID of the device 20, model, category and a list of command codes to support.

FIG. 6 illustrates an example of the list of command codes described using XML. Each command code generally includes an ID of the command and information for describing the command code.

In the example illustrated in FIG. 6, each command is represented by a key tag having a "name" attribute and an "ir" attribute. The "name" attribute is an ID of the command and expressed by a letter string expressing virtual code common between devices 20. The "ir" attribute describes a command code transmitted from the commander 10 of the IR control system. Here, instead of the "ir" attribute, an "rf" attribute or "ip" attribute may be used to describe a command code transmitted from the commander 10 of RF control system or IP control system.

According to the list CL of the command codes shown in FIG. 6, the device 20 supports the IR control system and supports command codes corresponding to virtual codes such as "Home", "Option, "Return" and the like.

Here, data for associating the command code with the virtual code is set by obtaining it from the device 20, obtaining it from the service server 30, designating of the virtual code by the user U by the use of a learning remote control category or the like.

In response to the registration request, first, the service server 30 determines whether the device information of each device 20 in the first devices 20*a* is registered in the device information DB 32 (S107). Then, if it is not registered, the service server 30 registers the device information in the device information DB 32 (S109). With this registration, even if the first device 20*a* is a newly developed device 20, the device information of the device 20 can be registered so that it is possible to use an existing macro based on the registered device information. Secondly, the service server 30 converts the device designation information in the macro to the category designation information (S111).

Figure 7:
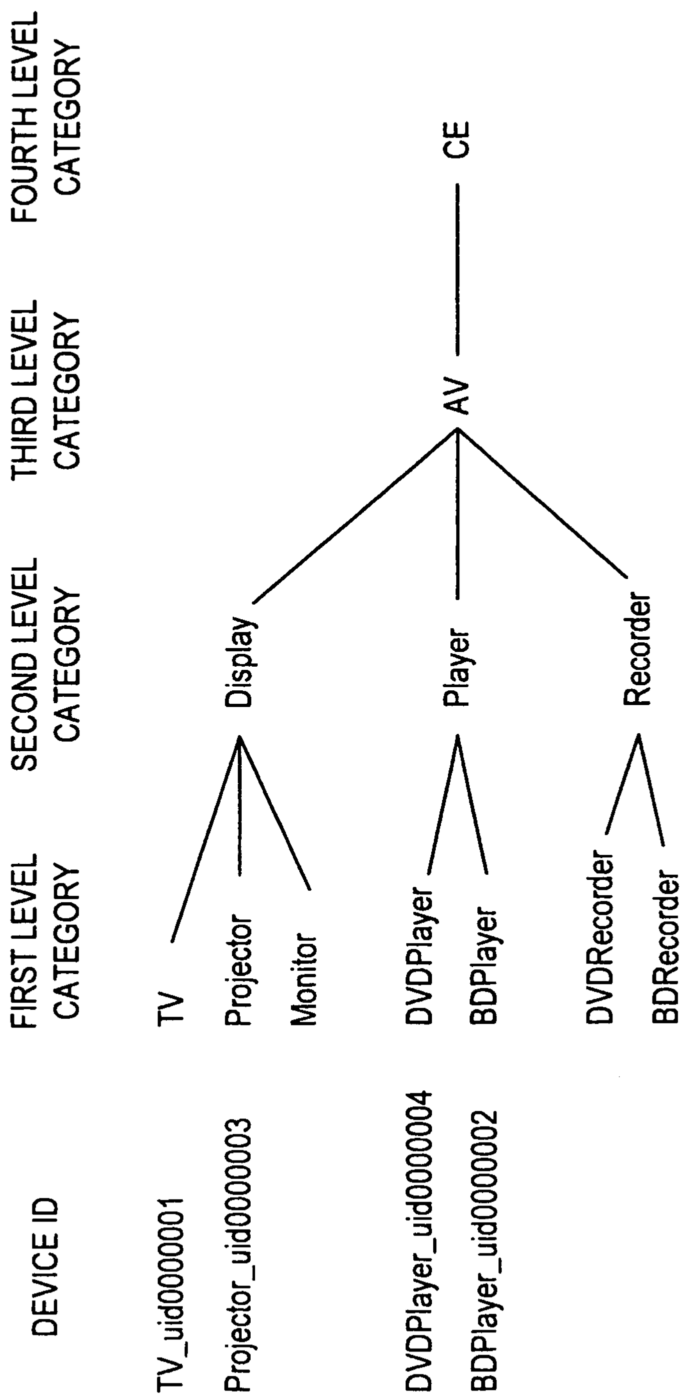
FIG. 7 illustrates an example of machine category classification.

FIG. 7 illustrates an example of category classification of a device. The service server 30 manages the device information using a category classification defined hierarchically. In the category classification, categories of first to forth levels designatable as category designation information are assigned to the ID (device designation information) of the device 20. The category of the device 20 may be defined either by the device information of the device 20 or by the service server 30.

For example, in the example illustrated in FIG. 7, the device "TV_uid0000001" is classified into "TV" in the first level and into "Display" together with the "Monitor" and "Projector" in the second level. Likewise, the device "BDPlayer_uid0000002" is classified into the "BDPlayer" in the first level and then into the "Player" together with the DVDplayer" in the second level.

Figure 8:
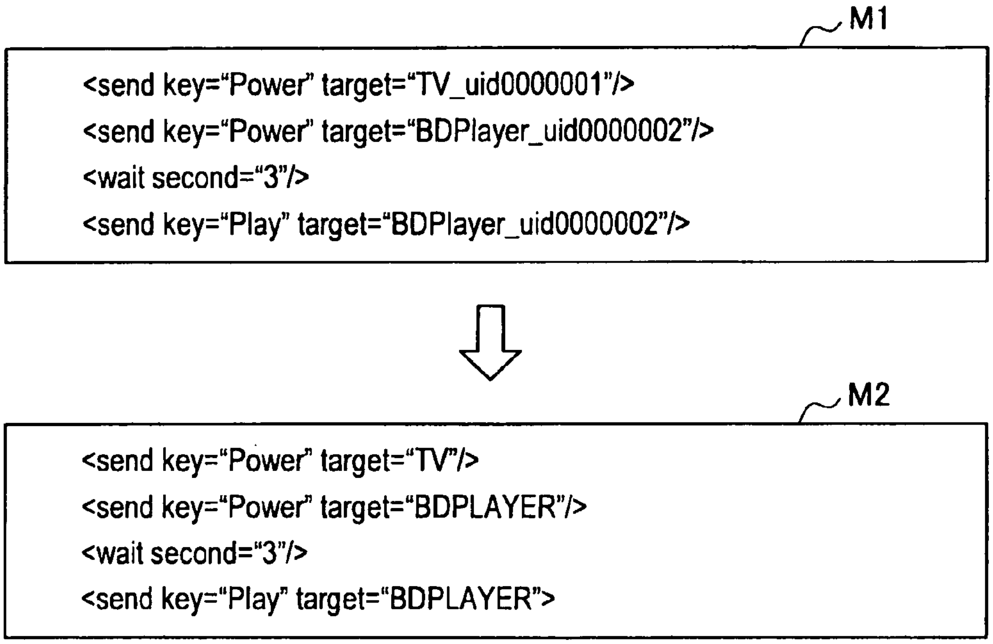
FIG. 8 illustrates an example of conversion of designation information in the registering processing.

FIG. 8 illustrates an example of macro conversion in the registration process. In the macro M2 illustrated in FIG. 8, the device designation information in the macro M1 shown in FIG. 3 is converted into the category designation information. That is, the device designation information for designating the device "TV_uid0000001" is converted into the category designation information for designating the category "TV" in the first level and the device designation information for designating the device BDPlayer_uid0000002" is converted to the category designation information for designating the category "BDPlayer" in the first level.

Thirdly, the service server 30 assigns a unique macro ID to the converted macro and registers the converted macro in the macro DB 31 (S113). When the macro is registered, the registration response is transmitted from the service server 30 to the commander 10*a* (S115) and the commander 10*a* notifies the user Ua of registration (S117).

[4. Macro Search Processing]

Next description is made about the macro search processing with reference to FIGS. 9 to 12.

Figure 9:
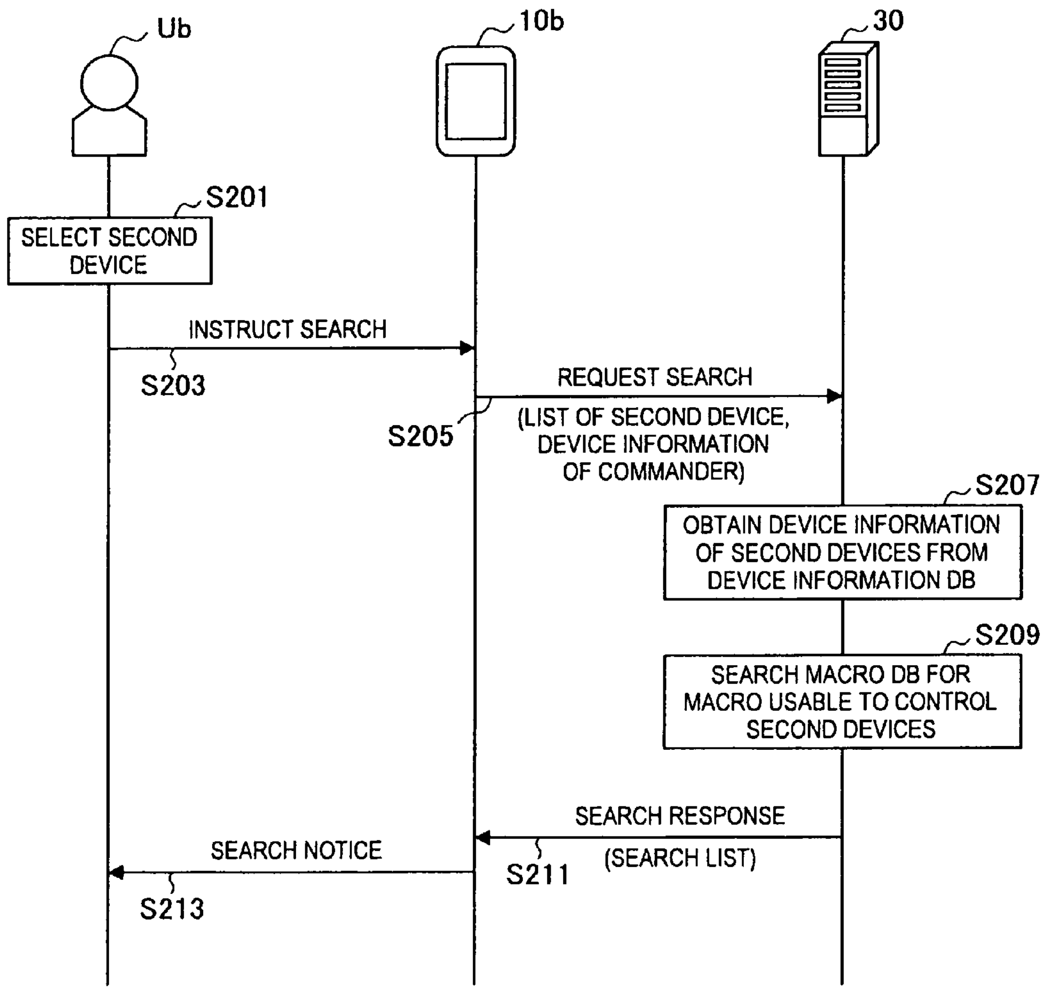
FIG. 9 is a sequence diagram illustrating a procedure of macro search processing.

FIG. 9 illustrates the procedure of macro search processing. The user Ub instructs search of a macro on the operation screen image illustrated in FIG. 10A. On the operation screen image, a list L2 is displayed that shows devices 20 controllable by the commander 10*b* in accordance with the use environment of the devices 20. The user Ub selects one or more devices 20 from the list L2 as the second devices 20*b* (S201) and instructs search by operation of a search button B2 (S203). In the example illustrated in FIG. 10A, the "devices 1 to 3" are selected by the pointer P and details D3 of the last selected "device 3" are displayed.

When the macro search is instructed, the commander 10*b* transmits the search request to the service server 30 (S205). The search request contains a device list showing the second devices 20*b* and device information of the commander 10*b*. Here, the device list contains an ID, a model and the like of each device 20 of the second devices 20*b*. The device information contains an ID, a model and a supported control system of the commander 10*b*.

In response to the search request, first, the service server 30 uses a model or the like of each device 20 in the second devices 20*b* contained in the device list as a basis to obtain the device information of the device 20 from the device information DB 32 (S207). Here, the device information contains, as described above, a list of command codes supported and categories of the device 20.

Secondly, the service server 30 searches the macro DB 31 for an existing macro usable to control the second devices 20*b* based on the device information of the devices 20 (S209). When the macro search is finished, a search response containing the search list is transmitted from the service server 30 to the commander 10*b* (S211) and the search notification is given from the commander 10*b* to the user Ub (S213)

Figure 10A:
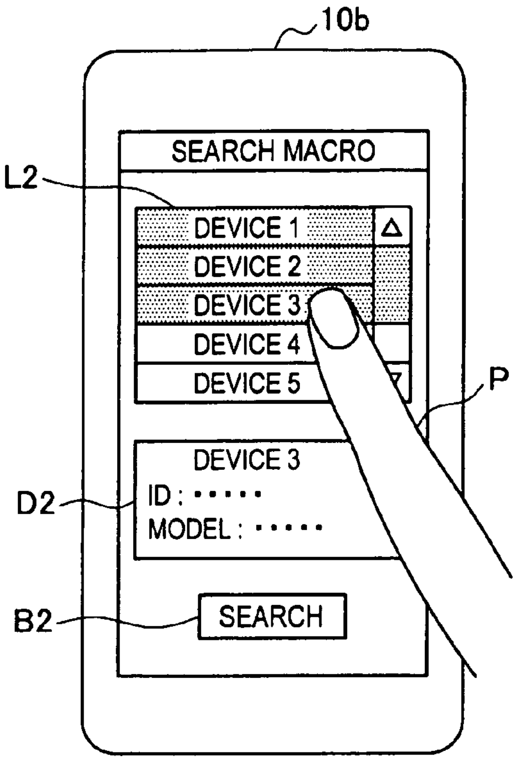
FIG. 10A illustrates an example of an operation screen image in the search processing (1/2)
Figure 10B:
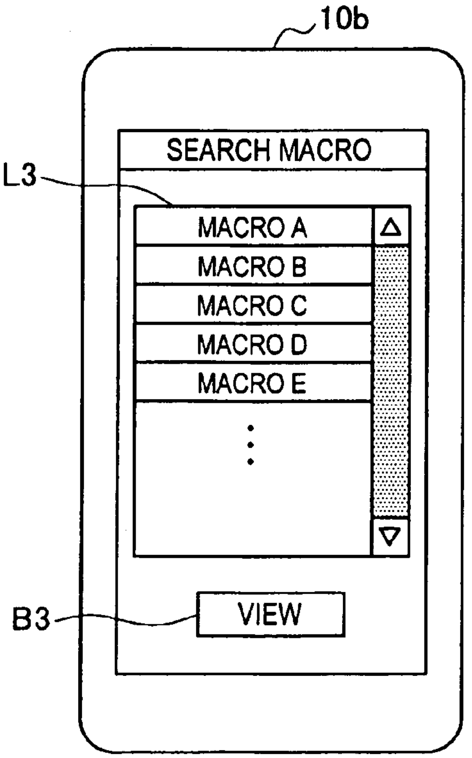
FIG. 10B illustrates an example of an operation screen image in the search processing (2/2)

When the search list is received, the commander 10*b* provides the user Ub with a search list on the operation screen image shown in FIG. 10B. On the operation screen image, a list L3 is displayed showing existing macros usable to control the second devices 20*b*. Here, in the example illustrated in FIG. 10B, the user Ub can select a desired macro to operate the view button B3 thereby to be able to view the details of the selected macro.

Figure 11:
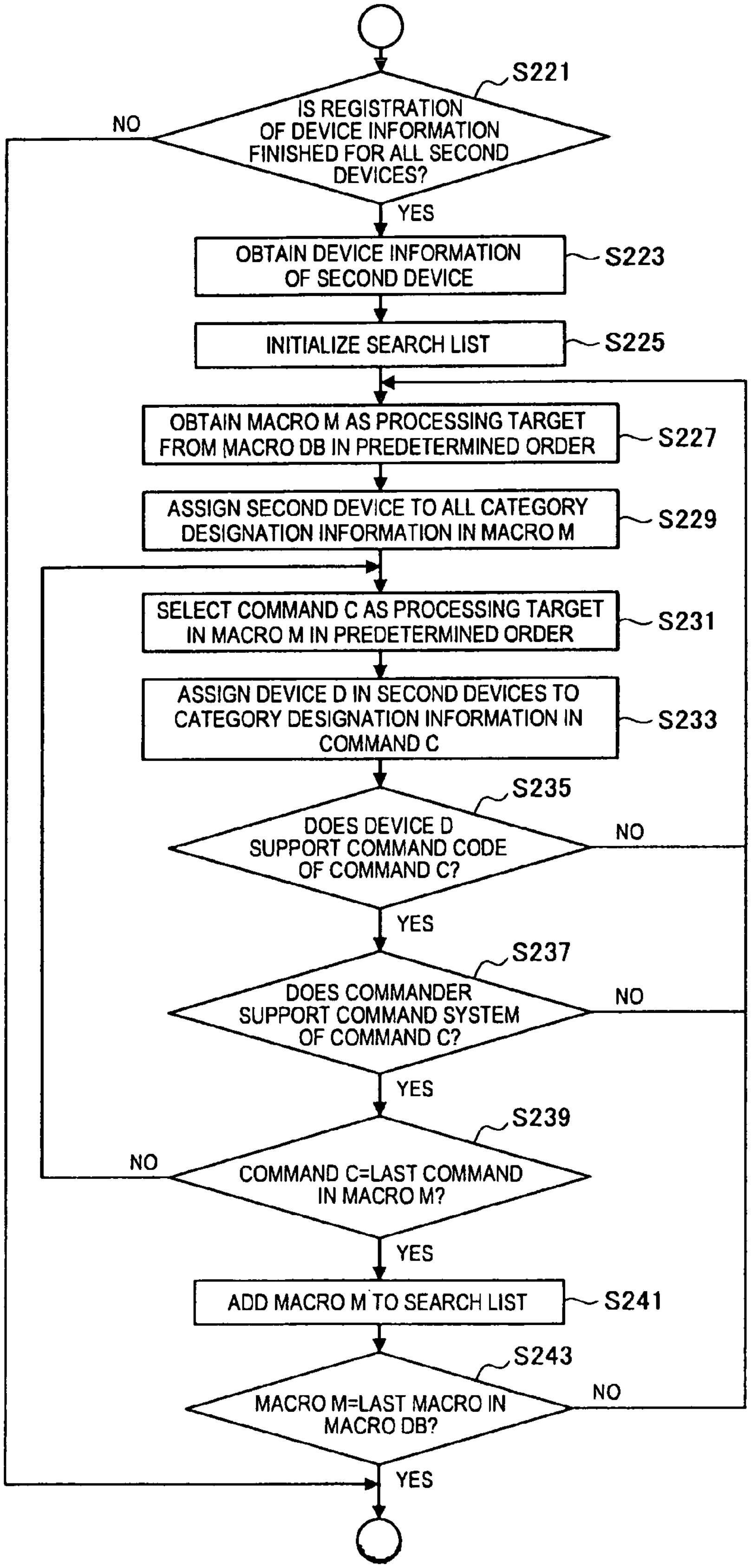
FIG. 11 is a flow chart illustrating details of the macro search processing (1/2)

FIG. 11 illustrates details of the processing of steps S207 and S209 shown in FIG. 9. As illustrated in FIG. 11, in response to a search request, the service server 30 determines whether or not device information of all devices 20 contained in the device list are registered in the device information DB 32 (S221).

If the determination result is positive, the service server 30 obtains the device information of the device 20 from the device information DB 32 (S223). After obtaining the device information of the device 20, the service server 30 initializes the search list (S225). Meanwhile, when the determination result is negative, the service server 30 stops the search processing. Here, when the determination result is negative, the device information of the device 20 may be obtained from the commander 10*b* and the processing of S223 and later steps may be performed.

When the search list is initialized, the service server 30 obtains one macro M that is a processing target from the macro DB 31 in a predetermined order (S227). The service server 30 uses the device information of the device 20 as a basis to assign each of devices 20 in the second devices 20*b* belonging to the category designated by the category designation information to all the category designation information in the macro M (S229). Here, the assignment processing of step S229 will be described later with reference to FIG. 12.

The service server 30 selects one command C as a processing target from the macro M following a predetermined order (S231). The service server 30 uses a result of assignment processing of step S229 as a basis to assign devices D in the second devices 20*b* to the category designation information of the command C (S233).

The service server 30 determines, based on the device information of the device 20, if the assigned device D supports the command code of the command C and the commander 10*b* supports the control system of the device D (S235, S237). Then, when the determination result is positive, the service server 30 performs the following processing and when the determination result is negative, it returns to the processing of step S227 and performs the processing of step S229 and later steps with the next macro as a macro M.

With this structure, as the device information of the device 20 contains command information showing the command code usable by the commander 10 to control the device 20, it is possible to bridge the difference in command code between the devices 20. Besides, as the command information contains a virtual code usable commonly between the devices 20 to identify the type of the command code, it is possible to bridge the difference in command code between the devices 20.

In addition, as the command information includes information indicating the control system of the command code, it is possible to bridge the difference in control system between the devices 20. Besides, as the device information of the commander 10 contains information indicating the control system usable by the commander 10 to control the device 20, it is possible to bridge the difference in control system between the commanders 10.

When the determination results of steps S235 and S237 are positive, the service server 30 determines whether the command C is the last command in the macro M or not (S239). Then, when the command C is not the last one, the service server 30 returns to the processing of step S231 and the processing of step S233 or later steps is performed with the next command as a command C.

On the other hand, when the command C is the last one, the service server 30 adds the macro M to the search list (S241) and determines if the macro M is the last macro registered in the macro DB 31 or not (S243). Then, when the macro is not the last one, the service server 30 returns to the processing of step S227 and the processing of step S229 or later steps is performed with the next macro as a macro M. On the other hand, when the macro is the last one, the service server 30 transmits the search list to the commander in step S211 shown in FIG. 9.

Here, in order to speed up the processing of steps S227 to S243, the macro index information may be registered in advance to be used. Further, two or more determination conditions may be determined together or a result of the preceding search processing may be cached to be used. Further, in order to speed up the processing of steps S233 to S241, a combination pattern of the devices 20 that can be control targets by the command C in the second devices 20*b* may be prepared to be used.

Figure 12:
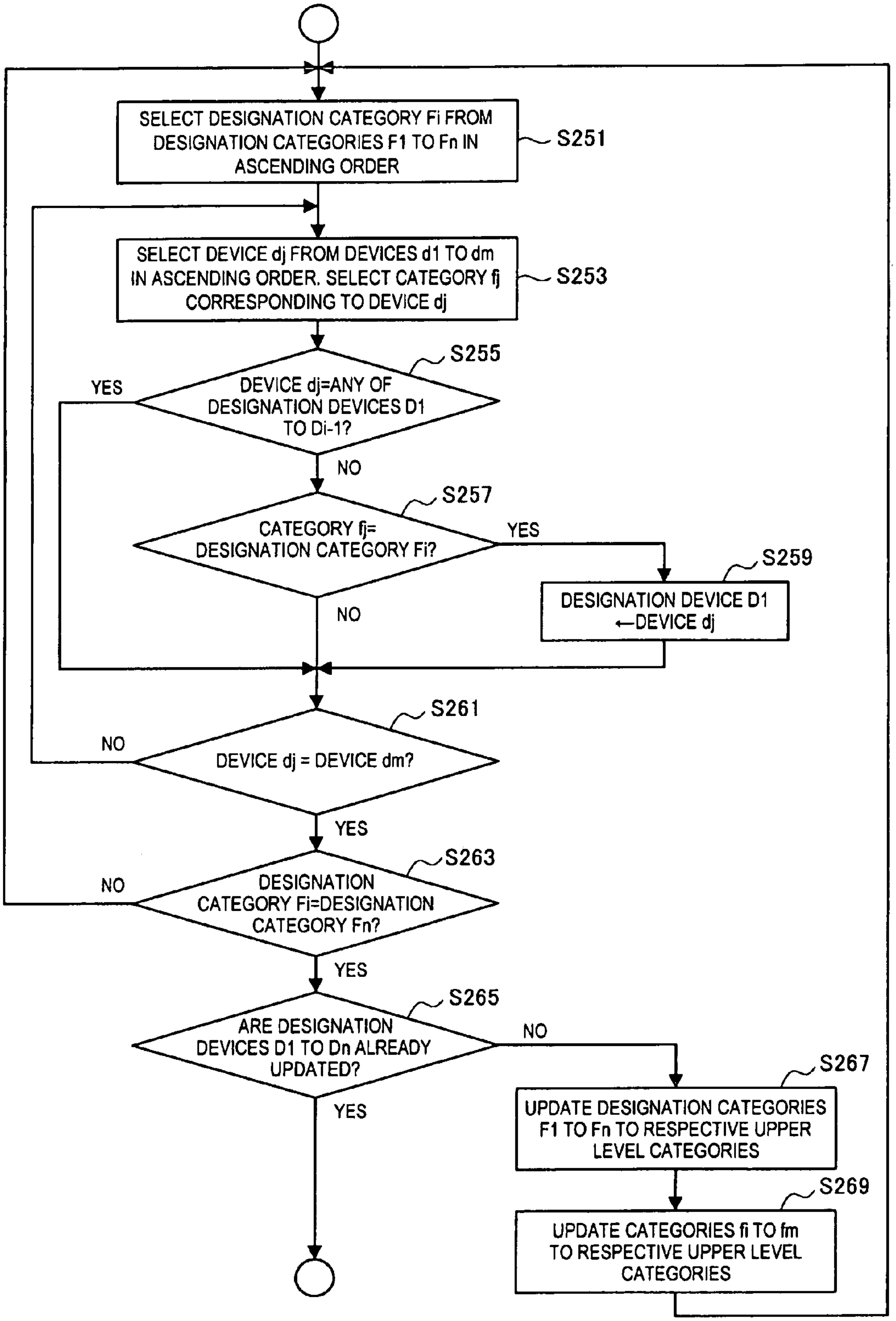
FIG. 12 is a flow chart illustrating details of the macro search processing (2/2)

FIG. 12 illustrates details of the processing of step S229 in FIG. 11. As illustrated in FIG. 12, the service server 30 assigns each device 20 in corresponding second devices 20*b* to each piece of category designation information in the macro M.

The following description is made assuming that the second devices 20*b* are devices d1 to dm and the categories of the devices d1 to dm are f1 to fm. Besides, the designation categories of the devices 20 designated in the macro M are F1 to Fn and the designation devices D1 to Dn out of the devices d1 to dm are assigned to the designation categories F1 to Fn.

The service server 30 selects one designation category Fi as a processing target from designation categories F1 to Fn in ascending order (S251). The service server 30 selects one device dj as a processing target from the devices d1 to dm in ascending order and selects the category fj of the device dj (S253).

The service server 30 determines whether or not the device dj matches any of designation devices D1 to Di-1 (S255). Then, when the determination result is negative, the service server 30 determines whether the category fj matches the designation category Fi (S257). When the determination results is positive, the processing of step S261 is performed assuming that the designation device Di is the device dj (S259).

When the determination result of the processing of step S255 is positive or the determination result of the processing of step S257 is negative, the service server 30 performs processing of step S261.

In step S261, the service server 30 determines whether the device dj is the last device dm or not, and when it is not the last device dm, it goes back to the processing of step S253, and "j" is incremented to update the device dj and category fj. Meanwhile, when it is the last device dm, the service server 30 determines whether the designation category Fi is the last designation category Fn or nor (S263), and when it is not the last designation category, it goes back to the processing of step S251 and "i" is incremented to update the designation category Fi. Meanwhile, when it is the last designation category Fn, the service server 30 determines whether or not updating is finished for all of the designation devices D1 to Dn (S265).

Then, when the determination result is positive, the service server 30 finishes assignment processing and moves to step S231 illustrated in FIG. 11. Meanwhile, when the determination result is negative, the service server 30 uses a classification item of one upper level in the category classification as illustrated in FIG. 7 to update the designation categories F1 to Fn and categories f1 to fm (S267, S269). Then, the service server 30 returns to the processing of step S251 and the "i" is incremented to update the designation category Fi.

In the processing of steps S267 and S269, the designation categories F1 to Fn and the categories F1 to fm are, for example, updated from the first level category "TV" to the second level category "Display" and then to the third level category "AV". Then, if there is no device dj corresponding to a certain level category, it becomes possible to assign a device dj corresponding to the upper level.

[5. Macro Providing Processing]

Figure 13:
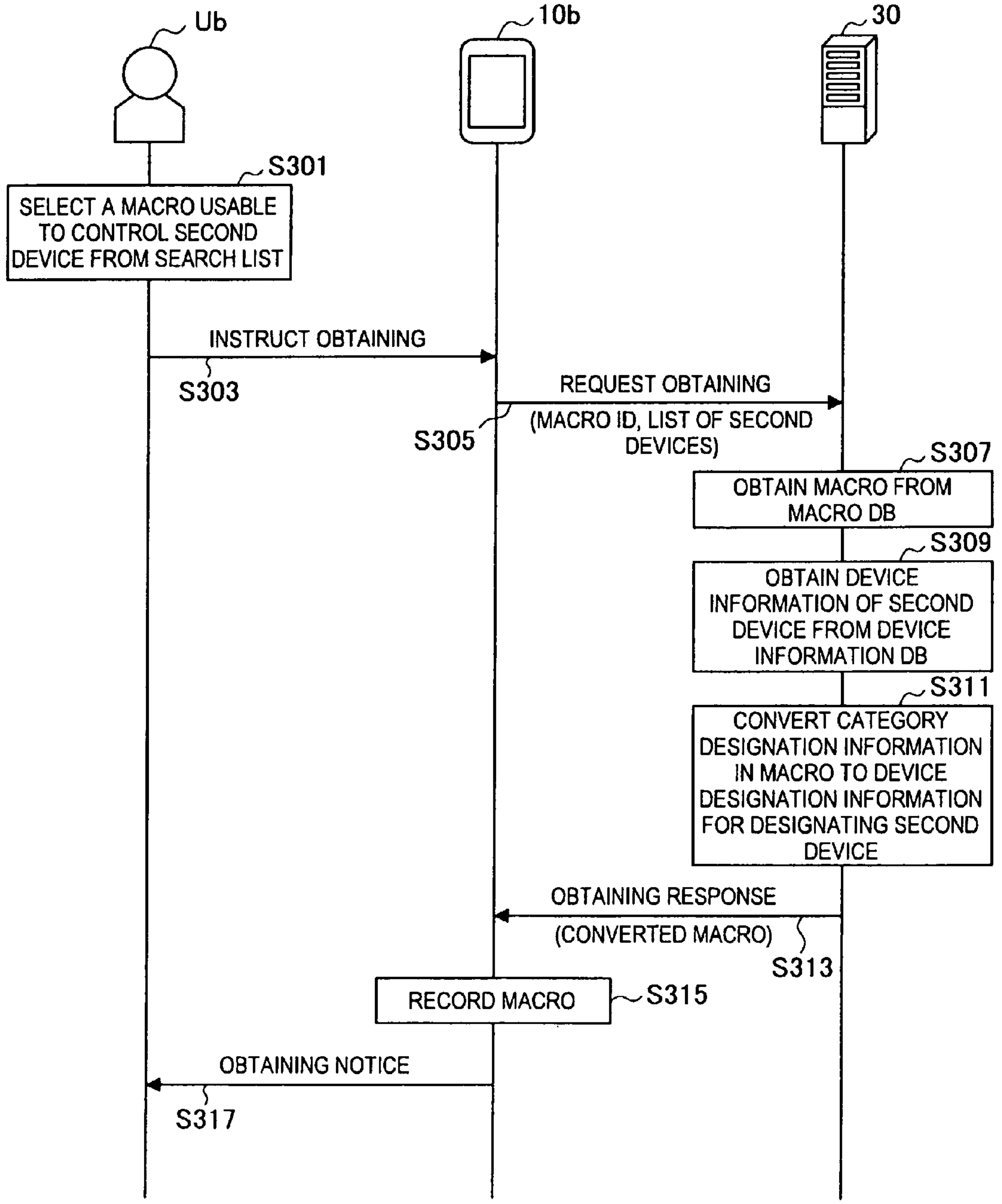
FIG. 13 is a sequence diagram illustrating a procedure of macro providing processing.
Figure 14:
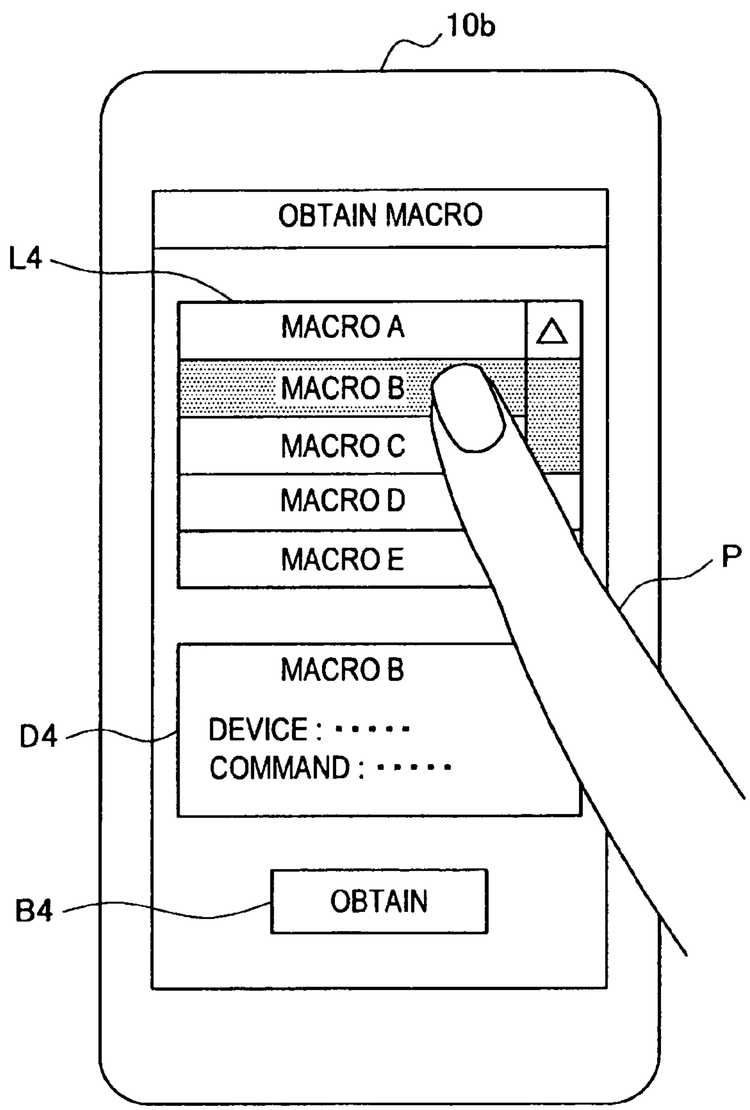
FIG. 14 illustrates an example of an operation screen image in the providing processing.

Next description is made about the macro providing processing, with reference to FIGS. 13 to 15.

FIG. 13 illustrates the procedure of the macro providing processing. The user Ub instructs obtaining of a macro on the operation screen image as shown in FIG. 14. The user Ub selects a desired macro from the search list L4 (S301) and instructs obtaining of the macro by operation of the obtaining button B4 (S303). In the example illustrated in FIG. 14, the "macro B" is selected by the pointer P and details D4 of the selected "macro B" are displayed.

When obtaining of the macro is instructed, the commander 10*b* transmits an obtaining request to the service server 30 (S305). The obtaining request contains a macro ID and a device list showing one or more devices 20 in the second devices 20*b*.

In response to the obtaining request, first, the service server 30 obtains a macro from the macro DB 31 based on the macro ID (S307). Secondly, the service server 30 obtains device information of each device 20 in the second devices 20*b* from the device information DB 32 based on the device list (S309). Thirdly, the service server 30 converts the category designation information in the selected macro to the device designation information for designating the device in the second devices 20*b* belonging to the category designated by the category designation information (S311).

FIG. 15 illustrates an example of macro conversion in the providing processing. In the macro M3 illustrated in FIG. 15, the category designation information in the macro M2 shown in FIG. 8 is converted to the device designation information. That is, the category designation information for designating the category "TV" is converted to the device designation information for designating the device "Projector_uid0000003" and the category designation information for designating the category "BDPlayer" is converted to the device designation information for designating the device "DVDPlayer_uid0000004".

Fourthly, the service server 30 transmits an obtaining response containing a converted macro to the commander 10*b* (S313). When receiving the macro, the commander 10*b* records the received macro (S315) and notifies the user Ub of obtaining of the macro (S317). The user Ub can control the second device 20*b* by executing the macro by the commander 10*b*.

Here, when the macro M3 shown in FIG. 15 is executed, the "power" command is transmitted to the device "Projector_uid0000003" and the "power" command is transmitted to the device "DVDPlayer_uid0000004". Then, after operation waiting time of three seconds with the "wait" tag, the "play" command is transmitted to the device "DVDPlayer_uid0000004".

[6. Conclusion]

As described up to this point, according to the system of this embodiment, selection of an existing macro and rewriting of a new macro are performed based on the category of the device 20. Therefore, it is possible to use a program, which is created for the device 20*a* in a certain use environment, as a macro for the device 20*b* in another use environment.

It should be understood by those skilled in the art that various modifications, combinations, sub-combinations and alterations may occur depending on design requirements and other factors insofar as they are within the scope of the appended claims or the equivalents thereof.

For example, the above description has been made by way of example where the program use system is applied to the system that handles macros usable via the controller 1. However, the program use system may be also applied to a system that handles programs usable via an information processing apparatus. In this case, the macro in the above description is equivalent to a program executed on the information processing apparatus, and the device designation information in the macro is equivalent to designation information for designating, in the program, another information processing apparatus that is subject to RPC (remote procedure call). Besides, a macro command is equivalent to an API that supports RPC and a macro control system is equivalent to an RPC implementing system.

Further, the above description has been made by way of example where conversion of designation information in a macro is conducted by the service server 30. However, the conversion of designation information may be conducted by the commander 10 in cooperation with the service server 30.

What is claimed is:

1. A program use system comprising:

a first converter configured to convert device designation information for designating each electronic device in one or more first electronic devices in an existing program for controlling the first electronic devices, to category designation information for designating a category of the electronic device based on device information of the electronic device;

a recorder configured to record the existing program of which the device designation information is converted;

a selector configured to select a program usable for controlling one or more second electronic devices from one or more existing programs recorded based on device information of the first and second electronic devices and a controller for controlling the second electronic devices; and a second converter configured to convert category designation information in the program selected to device designation information for designating the electronic device in the second electronic devices, belonging to a category designated by the category designation information, based on the device information of the controller and the first and second electronic devices, wherein the first and second electronic devices are classified into categories that represent functions of the electronic devices hierarchically, wherein the category designated by the category designation information to which belongs the device designation information for designating the electronic device in the second electronic devices is determined by an assignment process that matches, in ascending order, a category of categories having a hierarchy designated in the program with a category of the categories corresponding to the electronic device in the second electronic devices, and wherein the program usable for controlling one or more second electronic devices comprises a plurality of commands, and selecting the program comprises (i) assigning the one or more second electronic devices to the command based on category designating information of the command and category information for the one or more second electronic devices, (ii) determining whether or not the assigned one or more second electronic devices supports a command code of the command, and (iii) determining whether or not the controller for controlling the one or more second electronic devices supports the command system of the command.

2. The program use system according to claim 1, when there is no electronic device in the second electronic devices that corresponds to the category designation information expressed by a first level, the second converter converts the category designation information in the program to the device designation information for designating the electronic device corresponding to the category designation information expressed by a second level that is upper level of the first level.

3. The program use system according to claim 1, wherein the recorder records the device information of the first electronic devices.

4. The program use system according to claim 1, wherein the device information of the electronic device contains command information indicating a control command usable by the controller to control the electronic device.

5. The program use system according to claim 4, wherein the command information contains information which is used commonly between the electronic devices for identifying a type of the control command.

6. The program use system according to claim 4, wherein the command information contains information showing a control system of the control command.

7. The program use system according to claim 1, wherein the device information of the controller contains information indicating a control system usable by the controller to control the electronic device.

8. A program use method, comprising the steps of:

converting device designation information for designating each electronic device in one or more first electronic devices in an existing program for controlling the first electronic devices, to category designation information for designating a category of the electronic device based on device information of the electronic device;

recording the existing program of which the device designation information is converted;

selecting a program usable for controlling one or more second electronic devices from one or more existing programs recorded based on device information of the first and second electronic devices and a controller for controlling the second electronic devices; and converting category designation information in the program selected to device designation information for designating the electronic device in the second electronic devices, belonging to a category designated by the category designation information, based on the device information of the controller and the first and second electronic devices, wherein the first and second electronic devices are classified into categories that represent functions of the electronic devices hierarchically, and wherein the category designated by the category designation information to which belongs the device designation information for designating the electronic device in the second electronic devices is determined by an assignment process that matches, in ascending order, a category of categories having a hierarchy designated in the program with a category of the categories corresponding to the electronic device in the second electronic devices, and wherein the program usable for controlling one or more second electronic devices comprises a plurality of commands, and selecting the program comprises (i) assigning the one or more second electronic devices to the command based on category designating information of the command and category information for the one or more second electronic devices, (ii) determining whether or not the assigned one or more second electronic devices supports a command code of the command, and (iii) determining whether or not the controller for controlling the one or more second electronic devices supports the command system of the command.

9. A non-transitory recording medium on which is recorded a program for causing a computer to execute a program use method comprising:

converting device designation information for designating each electronic device in one or more first electronic devices in an existing program for controlling the first electronic devices, to category designation information for designating a category of the electronic device based on device information of the electronic device;

recording the existing program of which the device designation information is converted;

selecting a program usable for controlling one or more second electronic devices from one or more existing programs recorded based on device information of the first and second electronic device and a controller for controlling the second electronic devices; and converting category designation information in the program selected to device designation information for designating the electronic device in the second electronic devices, belonging to a category designated by the category designation information, based on the device information of the controller and the first and second electronic devices, wherein the first and second electronic devices are classified into categories that represent functions of the electronic devices hierarchically, and wherein the category designated by the category designation information to which belongs the device designation information for designating the electronic device in the second electronic devices is determined by an assignment process that matches, in ascending order, a category of categories having a hierarchy designated in the program with a category of the categories corresponding to the electronic device in the second electronic devices, and wherein the program usable for controlling one or more second electronic devices comprises a plurality of commands, and selecting the program comprises (i) assigning the one or more second electronic devices to the command based on category designating information of the command and category information for the one or more second electronic devices, (ii) determining whether or not the assigned one or more second electronic devices supports a command code of the command, and (iii) determining whether or not the controller for controlling the one or more second electronic devices supports the command system of the command.

* * * * *